(12) United States Patent
Baudart et al.

(10) Patent No.: US 10,696,333 B2
(45) Date of Patent: Jun. 30, 2020

(54) MOTOR VEHICLE DASHBOARD CROSSBEAM

(71) Applicant: Faurecia Interieur Industrie, Nanterre (FR)

(72) Inventors: Laurent Baudart, Fresnoy En Thelle (FR); Gregory Martin, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 16/272,567

(22) Filed: Feb. 11, 2019

(65) Prior Publication Data

US 2019/0168824 A1    Jun. 6, 2019

Related U.S. Application Data

(63) Continuation of application No. 15/080,066, filed on Mar. 24, 2016, now Pat. No. 10,232,892, which is a
(Continued)

(30) Foreign Application Priority Data

Mar. 5, 2010  (FR) ...................... 10 51621

(51) Int. Cl.
  *B62D 27/02*    (2006.01)
  *B62D 25/04*    (2006.01)
  *B62D 25/14*    (2006.01)

(52) U.S. Cl.
  CPC .......... *B62D 27/023* (2013.01); *B62D 25/04* (2013.01); *B62D 25/145* (2013.01); *B62D 27/02* (2013.01)

(58) Field of Classification Search
  CPC .... B62D 25/145; B62D 25/147; B62D 25/04; B62D 27/02; B62D 27/023; B62D 1/16; B62D 29/001; B62D 29/007
(Continued)

(56) References Cited

U.S. PATENT DOCUMENTS 4,297,911 A     11/1981  Grahn et al.
4,432,564 A *   2/1984   Tronville ................ B60B 35/06
                                                         267/273

(Continued)

FOREIGN PATENT DOCUMENTS

DE       4134436 A1    4/1992
DE      19830303 A1    1/2000
(Continued)

OTHER PUBLICATIONS

International Search Report for International application No. PCT/FR2011/050448, dated May 12, 2011, 2 pages.
(Continued)

*Primary Examiner* — D Glenn Dayoan
*Assistant Examiner* — Sunsurraye Westbrook
(74) *Attorney, Agent, or Firm* — Reising Ethington P.C.

(57) ABSTRACT

A motor vehicle dashboard crossbeam includes a tubular beam provided to extend between the A posts of the structure of the motor vehicle substantially in a transverse direction of the motor vehicle and a first and second fastening opening in the longitudinal direction, the first opening being formed through the beam and the second opening being formed through a fastening member attached on an end section of the beam. The end section can have a rectangular cross-section.

20 Claims, 4 Drawing Sheets

Related U.S. Application Data continuation of application No. 13/807,073, filed as application No. PCT/FR2011/050448 on Mar. 3, 2011, now Pat. No. 9,333,988.

(58) Field of Classification Search
USPC ......... 296/193.02, 70, 72, 203.02, 204, 192, 296/205, 29; 280/779, 781, 752; 180/90
See application file for complete search history.

(56) References Cited

U.S. PATENT DOCUMENTS

| | | | |
|---|---|---|---|
| 5,282,637 A | | 2/1994 | McCreadie |
| 5,931,520 A | | 8/1999 | Seksaria et al. |
| 6,176,544 B1 | * | 1/2001 | Seksaria ............... B60R 21/045 280/752 |
| 6,315,347 B1 | | 11/2001 | Gotz |
| 6,325,440 B1 | | 12/2001 | Emmerich |
| 6,382,695 B1 | | 5/2002 | Decome |
| 6,391,470 B1 | * | 5/2002 | Schmieder ........... B62D 25/145 280/779 |
| 6,523,878 B2 | * | 2/2003 | Scheidel ............... B62D 25/145 180/90 |
| 7,048,325 B1 | | 5/2006 | Sandhu et al. |
| 7,128,360 B2 | | 10/2006 | Scheib et al. |
| 7,152,295 B2 | | 12/2006 | Goetz et al. |
| 7,320,290 B2 | | 1/2008 | Watanabe |
| 7,407,221 B2 | | 8/2008 | Kring et al. |
| 7,571,950 B2 | | 8/2009 | Baudart |
| 7,963,589 B2 | | 6/2011 | Baudart |
| 8,220,857 B2 | | 7/2012 | Baudart et al. |
| 8,376,444 B2 | | 2/2013 | Scheib et al. |
| 8,393,671 B2 | * | 3/2013 | Watanabe ............ B62D 25/147 296/193.02 |
| 9,333,988 B2 | | 5/2016 | Baudart et al. |
| 9,446,800 B2 | * | 9/2016 | Davos ................. B62D 29/001 |
| 2005/0110302 A1 | | 5/2005 | Riha et al. |
| 2006/0119139 A1 | | 6/2006 | Luo et al. |
| 2007/0175375 A1 | | 8/2007 | Watanabe |
| 2007/0262613 A1 | | 11/2007 | Meier |
| 2008/0027609 A1 | | 1/2008 | Aoki et al. |
| 2008/0122265 A1 | | 5/2008 | Meier |
| 2015/0151793 A1 | | 6/2015 | Appasamy et al. |

FOREIGN PATENT DOCUMENTS

| | | |
|---|---|---|
| DE | 10101927 A1 | 7/2002 |
| DE | 10221654 A1 | 4/2003 |
| DE | 102006005023 A1 | 10/2006 |
| DE | 102007002431 A1 | 8/2007 |
| DE | 102006055506 A1 | 5/2008 |
| DE | 602004008725 T2 | 6/2008 |
| DE | 602005004462 T2 | 1/2009 |
| DE | 102008026138 A1 | 10/2009 |
| EP | 0896919 A2 | 2/1999 |
| EP | 1193161 A1 | 4/2002 |
| EP | 1647469 A1 | 4/2006 |
| EP | 1852333 A1 | 11/2007 |
| FR | 2790435 A1 | 9/2000 |
| FR | 2859446 A1 | 3/2005 |
| FR | 2861682 A1 | 5/2005 |
| FR | 2874581 A1 | 3/2006 |
| FR | 2881393 A1 | 8/2006 |
| FR | 2901529 A1 | 11/2007 |
| FR | 2925009 A1 | 6/2009 |
| WO | WO03031746 A2 | 4/2003 |

OTHER PUBLICATIONS

Written Opinion for International application No. PCT/FR2011/050448, dated May 12, 2011, 5 pages.

* cited by examiner

MOTOR VEHICLE DASHBOARD CROSSBEAM

TECHNICAL FIELD

The present invention relates to a motor vehicle dashboard crossbeam.

BACKGROUND

A motor vehicle dashboard crossbeam may comprise a tubular beam made in a single piece provided to extend between the A posts of the structure of the motor vehicle substantially in a transverse direction of the motor vehicle and means for fastening a or each end section of the beam on an A post, the fastening means comprising a first and second fastening opening in the longitudinal direction, the first opening being formed through the beam.

The dashboard crossbeam is designed to extend between the front side posts or the A post of the structure of the motor vehicle.

The dashboard crossbeam serves in particular to stiffen the structure of the motor vehicle and support functional equipment of the motor vehicle, such as a steering column, a heating, ventilation and air-conditioning system (HVAC system), a car radio, a GPS system, a passenger airbag module, a glove box, etc.

It is therefore desirable for the dashboard crossbeam to have a sufficient stiffness and to be fastened rigidly to the A posts.

FR 2 925 009 discloses a motor vehicle dashboard crossbeam comprising a beam made in a single piece whereof each end section is partially crushed to form two fastening bracket framing the end section, a fastening opening being formed through each bracket.

Nevertheless, in certain situations, such a beam does not make it possible to obtain sufficient stiffness of the beam itself and its fastening to the A posts.

SUMMARY

One aim of the invention is to propose a dashboard crossbeam that may have a sufficient stiffness and be sufficiently rigidly fastened to the structure of the motor vehicle.

To that end, the invention proposes a motor vehicle dashboard crossbeam of the aforementioned type, characterized in that the fastening means also comprise a fastening member attached on the or each end section, the second fastening opening being formed through the fastening member.

According to other embodiments, the dashboard crossbeam comprises one or more of the following features, considered alone or according to all technically possible combinations:
- the beam comprises a fastening bracket formed in a single piece with the or each end section and protruding outward from the or each end section, the first opening being formed through the platen;
- the fastening member is attached on the or each end section such that the first opening and the second opening are positioned on either side of the end section;
- the first opening and the second opening are arranged symmetrically on either side of the or each end section;
- the or each bracket gives the beam a substantially P-shaped or upside down P-shaped cross-section at the or each end section;
- the first opening is formed through two opposite surfaces spaced apart from the end section;
- a reinforcing member is inserted into the end section between the two opposite surfaces to keep them spaced apart;
- the beam comprises a central section, the or each end section being offset relative to the central section and connected thereto by a recess; and
- the central section is rectilinear.

The invention also relates to a motor vehicle comprising a dashboard crossbeam as defined above.

BRIEF DESCRIPTION OF THE DRAWINGS

The invention and its advantages will be better understood upon reading the following description, provided solely as an example and done in reference to the appended drawings, in which.

DETAILED DESCRIPTION OF THE ILLUSTRATED EMBODIMENTS

Figure 1:
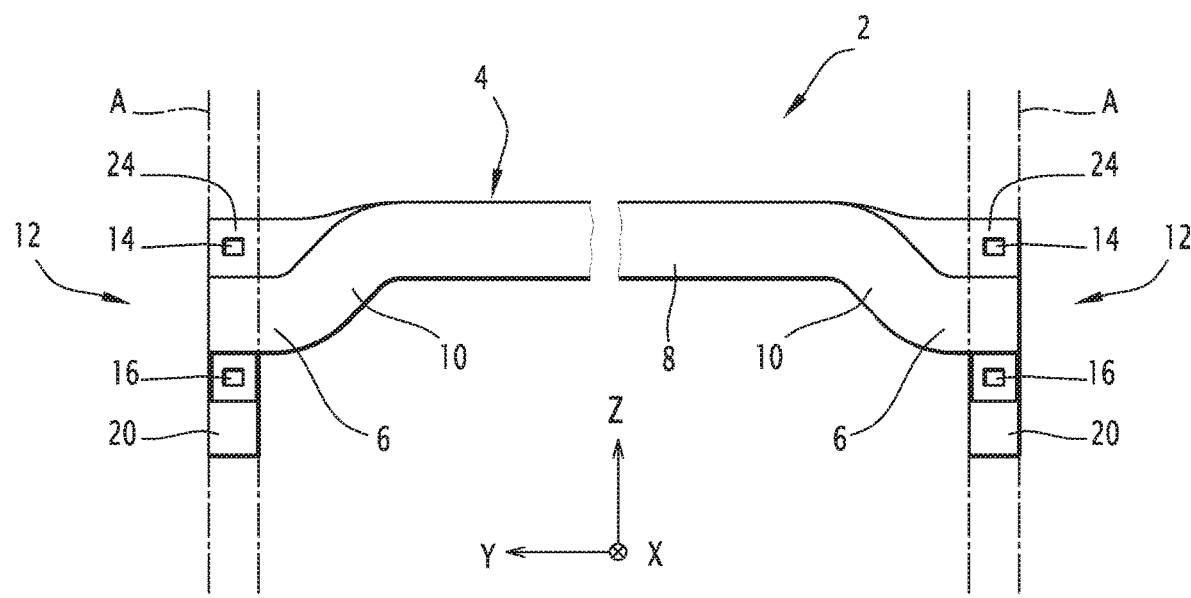
FIG. 1 is a front elevation view of a dashboard crossbeam according to the invention.

The motor vehicle dashboard crossbeam 2 of FIG. 1 is designed to be fastened transversely between the front lateral posts, or "A" posts, of the structure of the motor vehicle.

In the rest of the description, unless otherwise specified, the terms "longitudinal," "transverse," "vertical," "horizontal," "top" and "bottom" are understood in reference to the usual system of orthogonal axes of motor vehicles, illustrated in the figures and comprising:
- a horizontal longitudinal axis X-X oriented from back to front;
- a horizontal transverse axis Y-Y oriented from right to left; and
- a vertical axis Z-Z oriented from bottom to top.

The crossbeam 2 in particular serves to stiffen the structure of the motor vehicle and support functional equipment of the motor vehicle, such as a steering column, a heating, ventilation and air-conditioning system (HVAC system), a car radio, a GPS system, a passenger airbag module, a glove box, etc.

The crossbeam 2 comprises a metal tubular beam 4 made in a single piece extending substantially along the transverse axis Y-Y. The beam 4 comprises two end sections 6 and a central section 8 extending between the end sections 6. Each end section 6 is provided to be connected to a respective A post.

Each end section 6 is connected to the central section 8 by an upset 10 toward the bottom such that each end section 6 is downwardly offset relative to the central section 8.

The central section 8 is tubular and has a constant cross section, for example a circular cross section. It extends rectilinearly along the transverse axis Y-Y. Alternatively, the central section 8 may extend along a curved line, for example having rectilinear length portions connected by recesses, and/or a variable straight section.

The end sections 6 are tubular with a constant straight section and extend rectilinearly along the transverse axis Y-Y. They are off-centered along the vertical axis Z-Z downwardly relative to the central section 6.

Each end section 6 is provided to be fastened to a respective A post using a fastening element extending substantially along the longitudinal axis X-X. To that end, the crossbeam 2 comprises fastening means 12 for fastening each end section 6 on the structure of the vehicle.

The fastening means 12 of each end section 6 comprise a first opening 14 and a second opening 16 for fastening the end section 6 along the longitudinal axis X-X. The first opening 14 and the second opening 16 are spaced apart along the vertical axis Z-Z and are each provided for the passage of a fastening element of the screw, bolt or rivet type, substantially along the longitudinal axis X-X. Fastening elements are symbolized by mixed lines referenced 18 in FIG. 3.

According to the invention, the first opening 14 of the fastening means 12 of each end section 6 is formed through the beam 4 and the fastening means 12 also comprise a fastening member 20 attached on the end section 6, the second opening 16 being formed through the fastening member 20.

Figure 2:
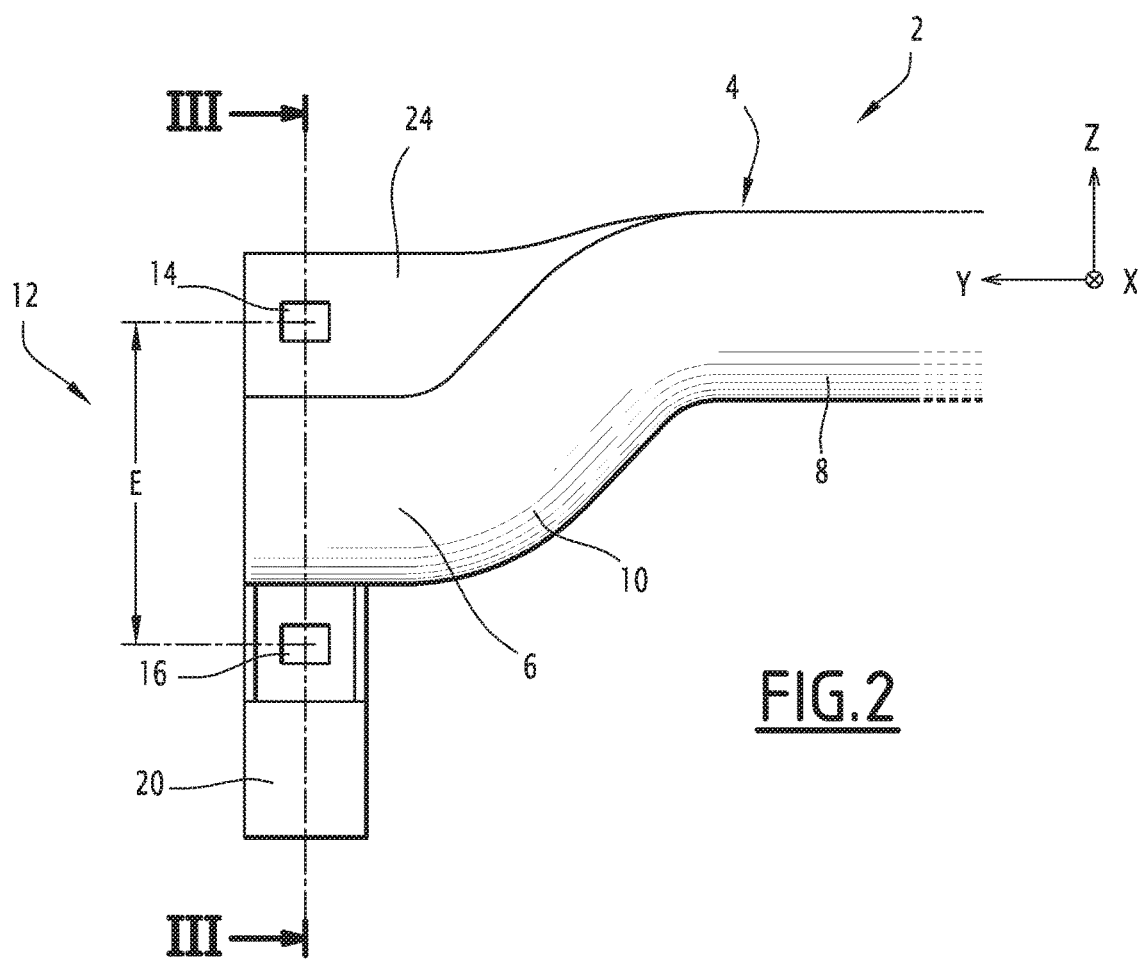
FIG. 2 is an enlarged view of a region of the dashboard crossbeam of FIG. 1.
Figure 3:
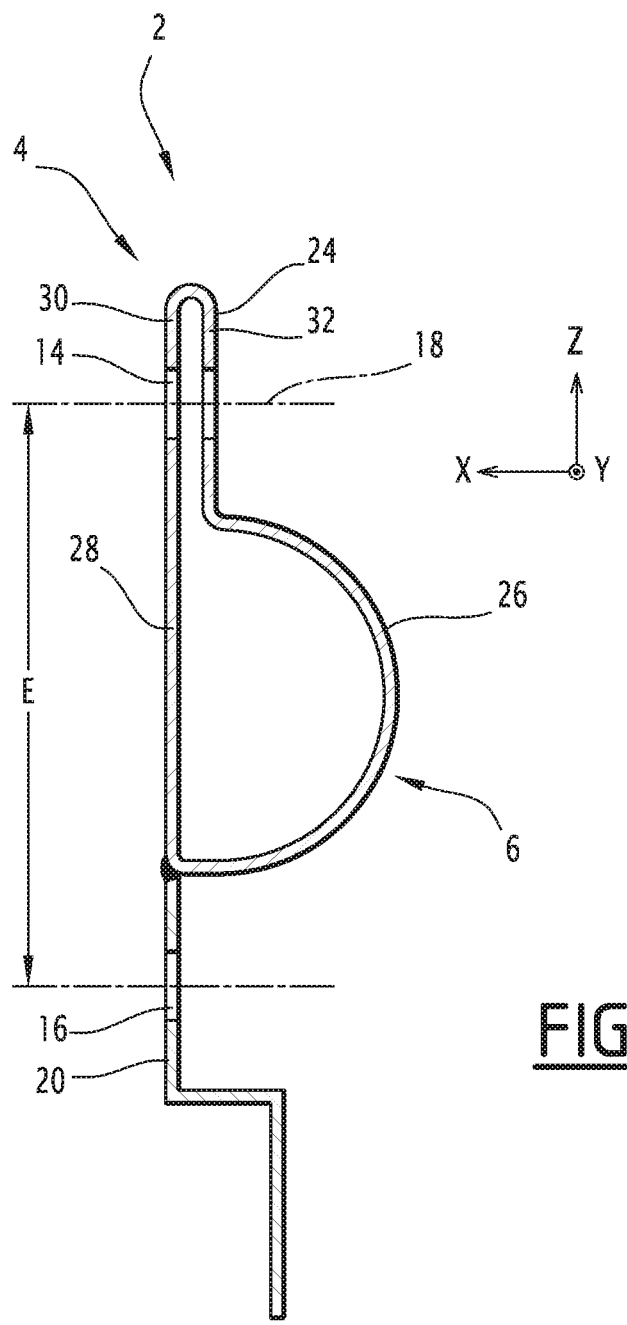
FIG. 3 is a cross-sectional view along of FIG. 2.

In the embodiment of FIGS. 1 to 3, the fastening means 12 of each end section 6 comprise a fastening bracket 24 extending along the end section 6 and integral with the beam 4. Each bracket 24 extends protruding outwardly from the corresponding end section 6, substantially in a transverse and vertical plane. The first fastening opening 14 is formed through the bracket 24.

The fastening member 20 is fastened under the end section 6 such that it protrudes downward from the end section 6. The fastening member 20 and the bracket 24 frame the end section 6. In this way, the first opening 14 and the second opening 16 frame the end section 6. Preferably, they are arranged symmetrically on either side of the end section 6.

As shown in FIG. 3, the beam 4 has, at each end section 6, a b- or upside down P-shaped cross section, the body of which is defined by the end section and the leg of which is defined by the bracket 24.

More specifically, each end section 6 has a substantially semicircular right section defined by a first wall 26 in the shape of an arc of circle and a second substantially planar wall 28 extending on the chord of the arc of circle. The bracket 24 is formed by a third wall 30 extending the second wall 28 outwardly and a fourth wall 32 returning toward and connecting on the first wall 26. In this way, the bracket 24 is made up of two thicknesses and the first opening 14 is formed through the two thicknesses.

As shown in FIG. 2, each bracket 24 extends along the corresponding end section 6 and extends along the corresponding recess 10 up to the junction with the central section 8, which makes it possible to ensure the stiffness of the end section 6. The bracket 24 has a height gradually decreasing from the free end of the end section to the central section 8.

The vertical center-to-center distance E between the first opening 12 and the second opening 14 is provided to be large enough for rigid fastening of the end section 6 on the corresponding A post.

The single-piece beam 2 is obtained using a hydroforming method known itself in which a tubular stub is positioned in a forming cavity and a pressurized fluid, such as water or oil, is injected inside the stub to deform it outwardly until it is pressed against the wall of the forming cavity, having the desired outer shape for the beam 2. The hydroforming method may represent a first step aiming to form bracket stubs, which are then crushed to obtain the shape illustrated in FIG. 3.

Each fastening member 20 is fastened on the corresponding end section 6 using any suitable means, and for example by welding.

The combination of a single bracket integral with the beam and a fastening member attached on the beam for the fastening of one or each end section makes it possible to obtain a rigid beam and rigid fastening of the beam. The end section may be provided with a significant vertical offset relative to the central section while preserving significant inertia and obtaining a sufficient center-to-center distance between the first and second fastening openings owing to the additional fastening member attached on the end section. The crossbeam may also be obtained inexpensively and with a limited number of assembly operations based on the fact that a single attached fastening member is necessary.

As shown in FIGS. 1 to 3, each bracket 24 extends from the corresponding end section 6 in the opposite direction from the offset between the end section 6 and the central section 8. More specifically, each end section 6 is offset downwardly relative to the central section 8 and the associated bracket 24 extends upward from the end section 6. Each bracket 24 extends substantially in the extension of the central section 8.

Figure 4:
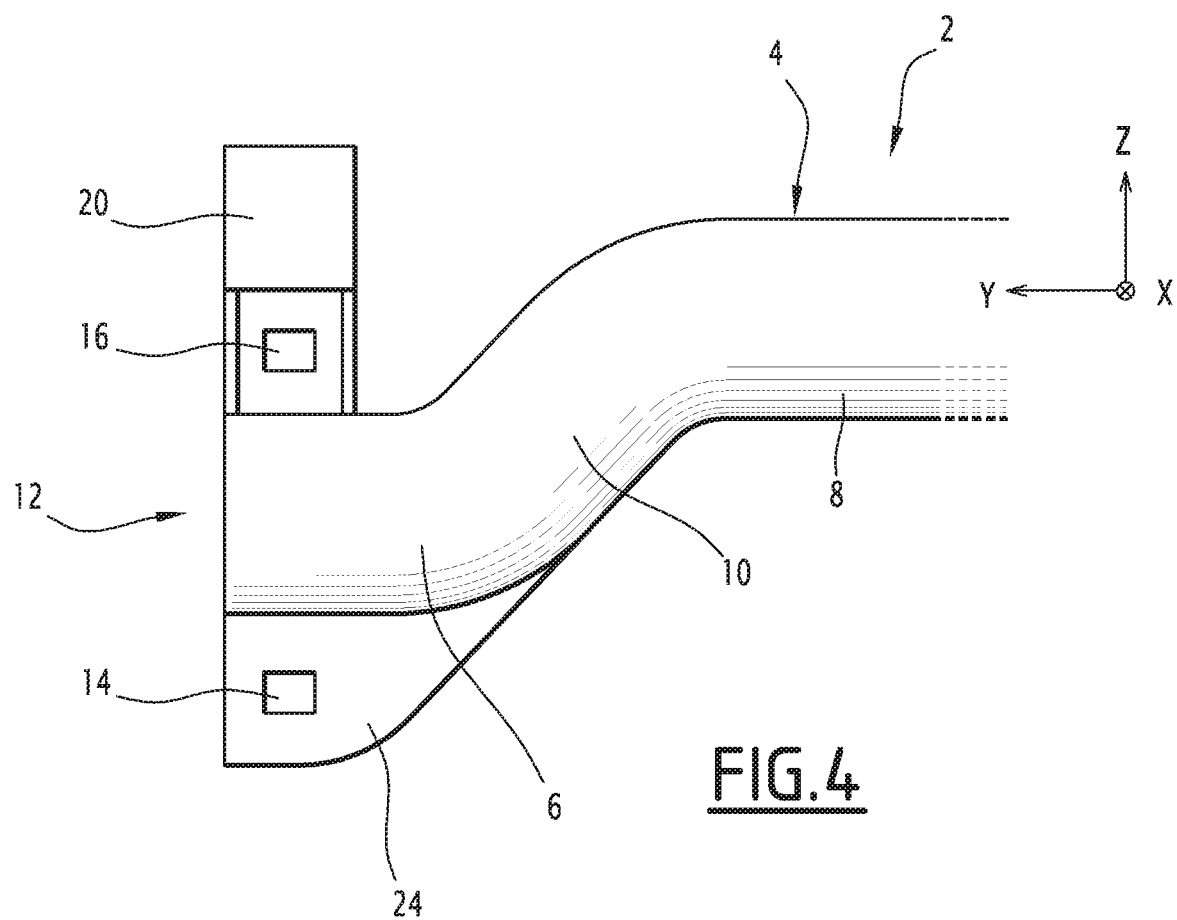
FIG. 4 is a view similar to that of FIG. 2 illustrating an alternative of the embodiments of FIGS. 1-3.

In one alternative illustrated in FIG. 4, the dashboard crossbeam 2 differs from that of FIGS. 1 to 3 in that each bracket 24 extends from the corresponding end section 6 in the direction of the offset between the corresponding end section 6 and the central section 8. More specifically, each bracket 24 extends downward from the end section 6. In that case, the fastening member 20 is fastened on the upper portion of the end section 6, such that it frames the end section 6 with the bracket 24. Each bracket 24 gives the crossbeam 2 a P-shaped cross section at the corresponding end section.

Figure 5:
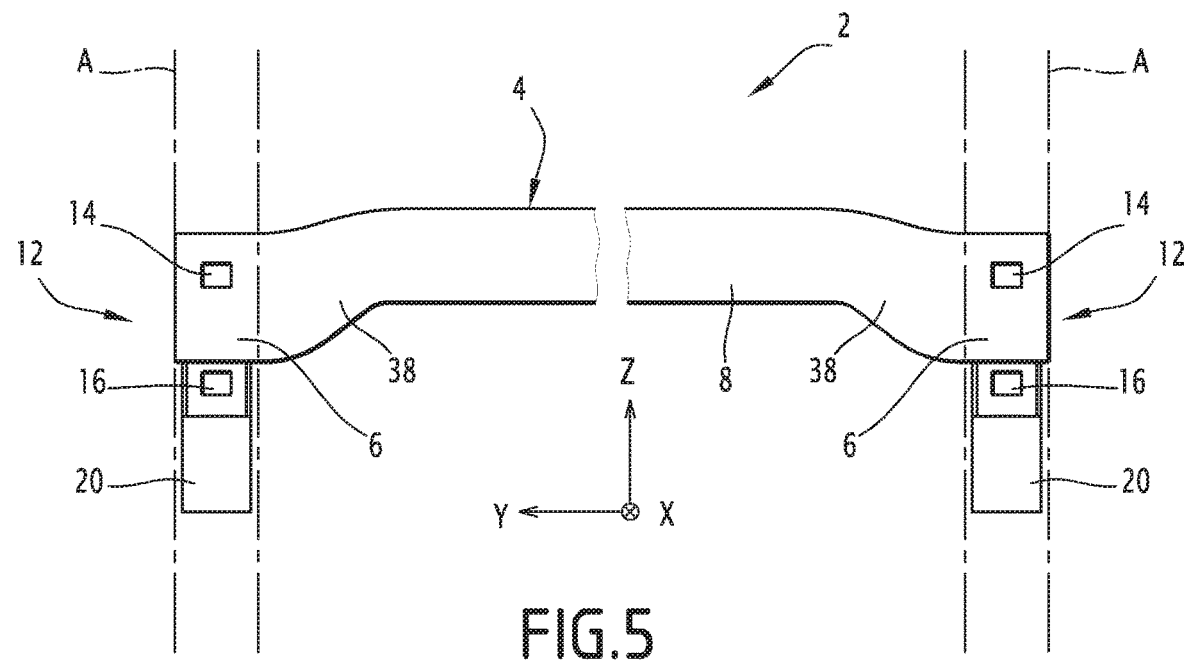
FIGS. 5-7 are views similar to those of FIGS. 1 to 3 of one alternative embodiment.
Figures 6, 7:
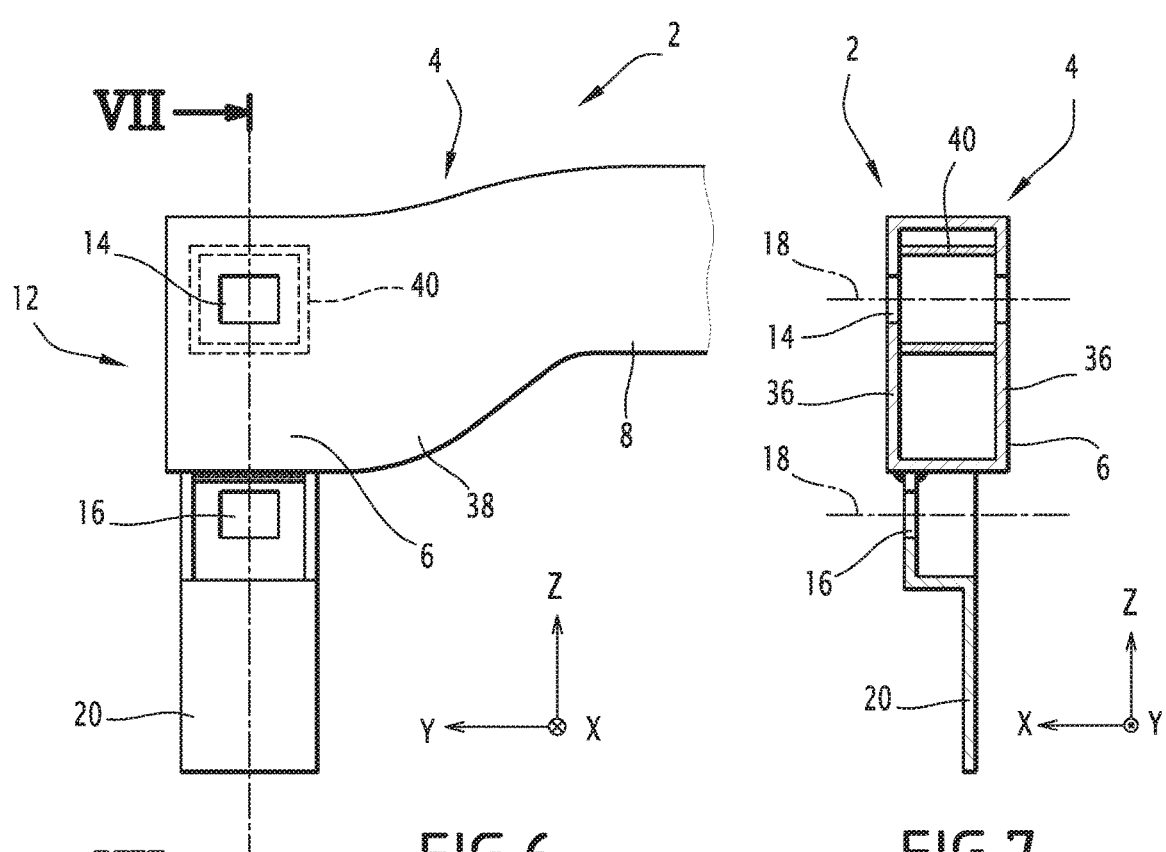

The dashboard crossbeam 2 shown in FIGS. 5 to 7 differs from that of the embodiment of FIGS. 1 to 3 in that the end sections 6 are provided without bracket and in that the first fastening opening 14 of each end section 6 is formed through that end section 6 in the same direction as the recess between the central section 8 and the end section 6.

The fastening member 20 is fastened on the top of the end section 6.

In the illustrated example, each end section 6 has a quadrangular right section (FIG. 7) and comprises two opposite vertical surfaces 36 through which the first opening 14 is formed. The first opening 14 is vertically offset, here upwardly, and the fastening member 20 is fastened on the end section 6 of the opposite side, here below, so as to obtain a sufficient center-to-center distance E between the first opening 14 and the second opening 16.

Each end section 6 is connected to the central section 8 by a transitional section 38 with a straight cross-section varying monotonously from the right cross-section of the central section 8, which is for example circular, to the right cross-section of the end section, which is for example quadrangular.

In the illustrated example, each end section 6 extends transversely while being offset downwardly relative to the central section 8. Each transitional section 38 widens gradually downward.

This beam may be obtained by hydroforming, or by stamping through successive steps from a tubular stub having the transverse cross-section of the central section, the end sections being deformed through successive steps during which an inner support is inserted into the end sections and dies are applied on the outer surface of the end sections until they are given the desired straight section.

As shown in FIG. 7, the crossbeam 2 advantageously comprises a reinforcing member 40 inserted inside each end section 6 and extending between the vertical surfaces 36 to oppose them coming closer together.

In the illustrated example, the reinforcing member 40 assumes the form of a tubular element extending transversely between the two vertical surfaces 36 across from the first opening 14 such that the axis of the first opening 14 extends through the reinforcing member 40.

The crossbeam of the embodiment of FIGS. 5 to 7 has advantages similar to those of the embodiment of FIGS. 1 to 3.

The invention is not limited to these embodiments, other alternatives being possible.

In particular, in the illustrated embodiments, each end section is fastened by means of a first opening provided through the beam and a second opening provided in a fastening member attached on the end section. Alternatively, only one of the two end sections is fastened in this way.

The invention claimed is:

1. A motor vehicle dashboard crossbeam provided to extend between A posts of the structure of the motor vehicle substantially in a transverse direction of the motor vehicle, the crossbeam comprising:
 a tubular end section to be fastened to an A post, the end section having a rectangular cross-section and a first fastening opening for fastening the end section to the A post along a longitudinal direction, wherein the first fastening opening extends through two opposite sides of the rectangular cross-section of the end section; and
 a fastening member attached on the end section along a third side of the rectangular cross-section extending between said two opposite sides of the cross-section, the fastening member comprising a second fastening opening formed through the fastening member for fastening the end section to the A post along the longitudinal direction, the first opening and the second opening being spaced apart.

2. The crossbeam of claim 1, wherein the two opposite sides of the rectangular cross-section through which the first fastening opening extends are vertical sides of the cross-section.

3. The crossbeam of claim 1, wherein third side of the rectangular cross-section is a bottom side of the rectangular cross-section.

4. The crossbeam of claim 1, further comprising an intermediate section and a transitional section connecting the intermediate section to the end section, wherein the intermediate section has a cross-section different from the cross-section of the end section, and the transitional section has a cross-section that varies between the end section and the intermediate section.

5. The crossbeam of claim 4, wherein the cross-section of the intermediate section is circular.

6. The crossbeam of claim 1, further comprising a reinforcing member disposed within the end section and extending between the two opposite sides of the rectangular cross-section through which the first fastening opening extends to oppose said two opposite sides from coming closer together.

7. The crossbeam of claim 6, wherein the reinforcing member is a tubular element such that the first fastening opening extends through the tubular element.

8. The crossbeam of claim 1, wherein the fastening member is welded to the end section.

9. The crossbeam of claim 1, wherein the fastening member is configured to receive a fastening element for fastening the end section to the A post along the longitudinal direction, and the second opening receives the fastening element.

10. The crossbeam of claim 1, wherein said two opposite sides of the rectangular cross-section are spaced apart in the longitudinal direction and thereby form two opposite sides of the tubular end section.

11. The crossbeam of claim 1, wherein the tubular end section and the fastening member are discrete and separately formed components of the crossbeam.

12. A motor vehicle dashboard crossbeam provided to extend between A posts of the structure of the motor vehicle substantially in a transverse direction of the motor vehicle, the crossbeam comprising:
 a tubular end section to be fastened to an A post, the end section having a rectangular cross-section and a first fastening opening for fastening the end section to the A post along a longitudinal direction, wherein the first fastening opening extends through two opposite sides of the rectangular cross-section of the end section; and
 a fastening member attached on the end section along a third side of the rectangular cross-section extending between said two opposite sides of the cross-section, the fastening member comprising a second fastening opening formed through the fastening member for fastening the end section to the A post along the longitudinal direction, the first opening and the second opening being spaced apart,
 wherein the first fastening opening is offset from the center along said two opposite sides toward a fourth side of the rectangular cross-section opposite said third side.

13. The crossbeam of claim 12, wherein the two opposite sides of the rectangular cross-section through which the first fastening opening extends are vertical sides of the cross-section.

14. The crossbeam of claim 12, wherein third side of the rectangular cross-section is a bottom side of the rectangular cross-section.

15. The crossbeam of claim 12, further comprising an intermediate section and a transitional section connecting the intermediate section to the end section, wherein the intermediate section has a cross-section different from the cross-section of the end section, and the transitional section has a cross-section that varies between the end section and the intermediate section.

16. The crossbeam of claim 15, wherein the cross-section of the intermediate section is circular.

17. The crossbeam of claim 12, further comprising a reinforcing member disposed within the end section and extending between the two opposite sides of the rectangular cross-section through which the first fastening opening extends to oppose said two opposite sides from coming closer together.

18. The crossbeam of claim 17, wherein the reinforcing member is a tubular element such that the first fastening opening extends through the tubular element.

19. The crossbeam of claim 12, wherein the fastening member is welded to the end section.

20. A motor vehicle dashboard crossbeam provided to extend between A posts of a motor vehicle substantially in a transverse direction of the motor vehicle, the crossbeam comprising a tubular beam having opposite end sections, at least one of the end sections being configured for attachment in the longitudinal direction to an A post via a fastening assembly having spaced apart first and second fastening openings, the first fastening opening being formed through the end section of the beam and the second fastening opening being formed through a fastening member, wherein the tubular beam and the fastening member are discrete and separately formed components of the crossbeam with the fastening member attached to the end section of the beam.

* * * * *